B. SCOFIELD.
Fertilizer, Distributer, Planter and Cultivator.
No. 167,274. Patented Aug. 31, 1875.
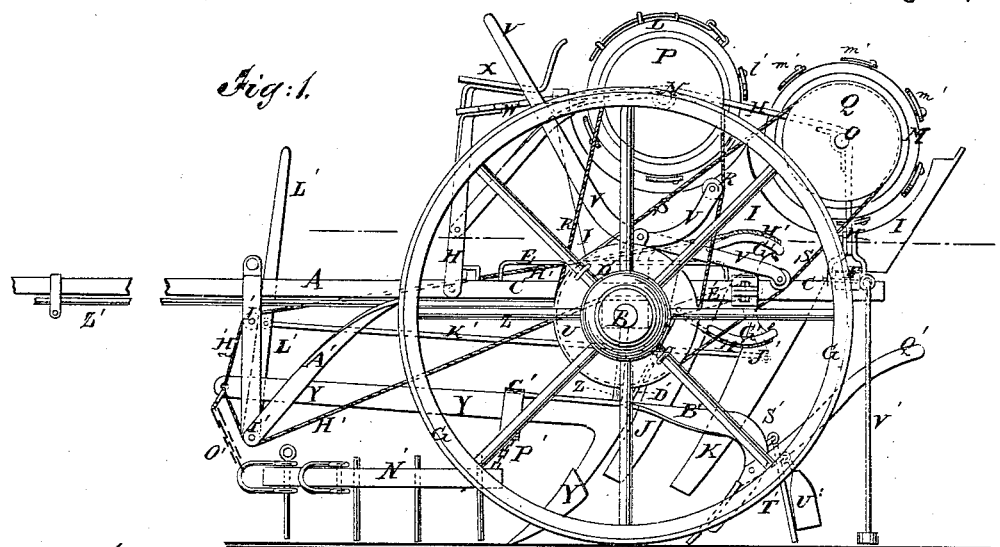
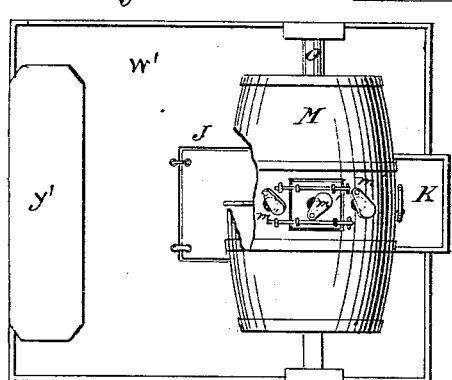
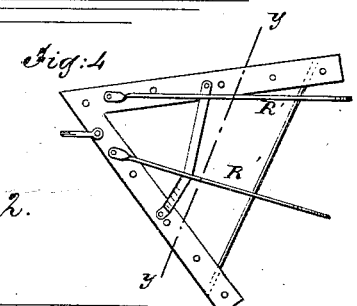
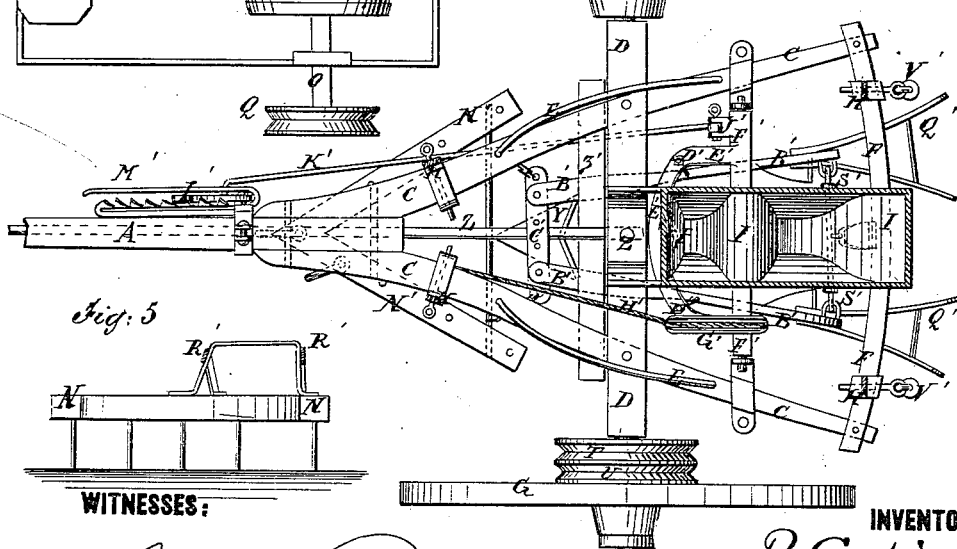
WITNESSES:
INVENTOR:
B. Scofield
BY
ATTORNEYS.

UNITED STATES PATENT OFFICE.

BOLIVAR SCOFIELD, OF CARTERSVILLE, GEORGIA.

IMPROVEMENT IN FERTILIZER-DISTRIBUTERS, PLANTERS, AND CULTIVATORS.

Specification forming part of Letters Patent No. 167,274, dated August 31, 1875; application filed June 5, 1875.

*To all whom it may concern:*

Be it known that I, BOLIVAR SCOFIELD, of Cartersville, in the county of Bartow and State of Georgia, have invented a new and useful Improvement in Combined Fertilizer, Distributer, Planter, and Cultivator, of which the following is a specification:

Figure 1 is a side view of my improved machine. Fig. 2 is a top view of the same, the barrels being removed. Fig. 3 represents a modification used when coarse manure is to be distributed. Fig. 4 is a detail top view of the harrow. Fig. 5 is a rear view of the same, the handles being shown in section through the line $y\ y$, Fig. 4.

Similar letters of reference indicate corresponding parts.

The invention relates to the construction and arrangement of parts, as hereinafter described, in connection with others (not claimed) which are necessary to form a complete machine of the class indicated in above title.

A represents the tongue; B, the forward axle; C, the forward hounds; D, the sand-board; E, the braces, and F the sway-bar, of the forward part of the running-gear of an ordinary two-horse wagon. Upon the journals of the axle C are placed the rear wheels G of the wagon. The parts hereinbefore described may be made expressly for the machine, if desired. H are two arched bars or frames, the rear ends of which are bolted to the sway-bar F near its ends. The forward ends of the bars or frames H are bolted to the forward part of the hounds B near the rear end of the tongue A. To the sand-board D and sway-bar F, between the bars or frames H, is secured a box, I, from which two spouts, J K, lead down nearly to the ground, the forward spout J being intended to conduct the fertilizer to the ground, and the rear spout K to conduct the seed to the ground. The front and rear sides of the box I have semicircular notches formed in them to receive the barrels L M, the forward one, L, of which is designed to contain and distribute guano or other fine fertilizer, and the rear one, M, to contain and distribute seed. In one side of each of the barrels L M is cut a hole sufficiently large to allow the fertilizer and seed to be conveniently put in. The piece cut out is then put back to serve as a door for said hole, and is hinged at one edge, and secured at the other edge when closed by hooks, catches, or other convenient fastenings. Around the center of the barrels, at the distance of two inches, more or less, from each other, are formed holes, which are provided with pivoted or sliding covers or valves $l'\ m'$, to enable the said holes to be partially covered to regulate the discharge of the fertilizer or seed, or fully covered to prevent the escape of the fertilizer or seed. N O are shafts, which pass through and are secured to the centers of the heads of the barrels L M, respectively, and the journals of which revolve in bearings attached to the bars or frames H. To one end of the shafts N O, upon the outer side of the bar or frame H, are rigidly attached the pulleys P Q, around which pass the endless bands R S, which also pass around the pulleys T U, which are rigidly attached to the inner side of the wheel G, so as to be concentric with said wheel. To the end part of the sand-board D is pivoted a bent lever, V, the lower end of which is forked or branched, and has friction-wheels attached to the ends of said branches, to bear against the endless bands R S, and give them sufficient tension to rotate the barrels L M. The forward arm of the lever V passes up across the notched bar W, which is attached to the bar or frame H, and by which the said lever is held in any position into which it may be adjusted. The upper end of the lever V projects into such a position that it may be conveniently reached and operated by the driver from his seat X, the supports of which are attached to the forward parts of the bars or frames H. Y is the opening-plow, the rear part of which moves up and down upon a guide-pin, Z, attached to the center of the axle B, and the forward end of the beam of which passes between two brackets, A', which are attached to the lower side of the tongue A, and by which the draft strain of the said plow Y is sustained. B' are the covering-plows, the forward ends of the beams of which are attached to the end parts of a cross-bar, C', which is attached at its center to the rear part of the beam of the opening-plow Y. To the beams of the three plows Y B' B' are pivoted the lower ends of three rods, D', the upper ends of which are pivoted to the forward part or bend of the horizontal U-bar E'. The ends of the U-bar E' are rigidly attached to a cross-shaft, F', the ends of which work in bearings attached to the hounds C.

To the rock-shaft F', near one end, is attached an upright cross-bar, G', to the ends of which are attached the ends of two cords, H', which pass over the axle B, around pulleys I', pivoted to the upper and lower parts of the brackets A', and their ends are attached to the forward end of the beam of the opening-plow Y. To the cross-shaft F' is rigidly attached a downwardly-projecting arm, J', to the lower end of which is pivoted the rear end of a rod, K'. The forward end of the rod K' is pivoted to the lever L', the lower end of which is pivoted to the lower parts of the brackets A'. The lever L' passes up through a keeper, M', attached to the side of the tongue A, and in which are formed a number of notches to receive the lever L' and hold it in any position into which it may be adjusted. The upper end of the lever L' projects into such a position that it may be conveniently reached and operated by the driver with his foot.

With this construction the driver, by operating the lever L' with his foot, can adjust the three plows to work at any desired depth in the ground, or can raise them entirely away from the ground, as may be desired.

N' is a small triangular harrow, the forward end or angle of which is connected with the forward end of the beam of the opening-plow Y by a short chain, O', and its rear corners are connected with the ends of the cross-bar C' by two short chains, P'.

By this construction the harrow N' will be raised from the ground by and with the opening-plow Y.

The plows Y B' B' are provided with detachable handles Q', so that they may be used separately when desired. The harrow N' is also provided with detachable handles R', as shown in Figs. 4 and 5, so that it may be used separately as a cultivator when desired. In this case the draft should be attached at one side of its forward angle, as indicated, by the second clevis, so that one of its bars may run parallel with the row of plants. The rear parts of the covering-plows B' are connected by a rod, S', which is made detachable, so that it may be replaced by a rod of a different length, so that the said plows may be adjusted to work at any desired distance apart. To the rod S' is hinged the upper edge of a plate, T, the lower edge of which rests upon the ground, to cover the seed and smooth off the surface of the ground. The plate T' is held to its work by a weight, U', hung from its upper edge, and which rests against its rear side.

The machine is designed to be balanced when the driver is in his seat; but should he leave his seat, or step back to the rear part of the machine, the tendency will be to tip over backward.

V' are two rods, which are pivoted to the end parts of the sway-bar F, and the lower ends of which have feet formed upon them, and rest upon the ground, so that the said rods may serve as braces or legs for the machine should it tip to the rearward.

In case the tongue A should not be strong enough to sustain the draft-strain, it is strengthened by a false tongue, Z', placed beneath it. The forward end of the false tongue Z' is secured to the forward part of the tongue A, and its rear end is placed upon a bar, $z'$, slipped into the space between the axle B, hounds C, and the lower hound-braces E.

When coarse manure is to be distributed the box I is replaced with the larger box W', the bars or frames H are detached, and the shaft of the rear barrel M is pivoted to arms X', attached to the said box W', the forward barrel L being removed. In this case the manure is pushed or drawn into the spout J with rakes or hooks by a man sitting upon the seat Y', or walking in the rear of the machine.

The spout J of the box W' is provided with a valve or trap-door, $w^1$, which may be closed by a rod, $w^2$, to prevent the escape of manure when passing from place to place.

With the adjustment shown in Fig. 1, the harrow N' removes lumps, clods, and rubbish, the plow Y opens a furrow to receive the fertilizer and seed, the fertilizer is deposited in the furrow through the spout J close in the rear of the plow Y, the fertilizer is covered, and the furrow is partially filled by the plows B'. The seed is then deposited through the spout K, and covered by the weighted plate T' U'.

Having thus described my invention, I claim as new and desire to secure by Letters Patent—

1. The combination of the three plows Y B' B', the brackets A', the cross-bar C', the connecting-rod S', the covering-plate T', and the weight U' with the tongue A and the distributing-spouts J K of the machine, substantially as herein shown and described.

2. The combination of the lifting-rods D', the U-bar E', the rock-shaft F', the upright cross-bar G', the cords H', the pulleys I', the rigid arm J', the rod K', and the lever L', with the plows Y B' B', and the frame-work of the machine, substantially as herein shown and described.

BOLIVAR SCOFIELD.

Witnesses:
R. W. SATTERFIELD,
A. L. BARRON.